United States Patent
Ferrari et al.

(10) Patent No.: US 10,650,538 B2
(45) Date of Patent: May 12, 2020

(54) DETECTING AND MEASURING THE SIZE OF CLODS AND OTHER SOIL FEATURES FROM IMAGERY

(71) Applicants: CNH Industrial Canada, Ltd., Saskatoon (CA); Autonomous Solutions, Inc., Mendon, UT (US)

(72) Inventors: Luca Ferrari, Modena (IT); John H. Posselius, Ephrata, PA (US); James W. Henry, Saskatoon (CA); Taylor C. Bybee, Logan, UT (US)

(73) Assignees: CNH Industrial Canada, Ltd., Saskatoon, Saskatchewan (CA); Autonomous Solutions, Inc., Mendon, UT (US)

( * ) Notice: Subject to any disclaimer, the term of this patent is extended or adjusted under 35 U.S.C. 154(b) by 140 days.

(21) Appl. No.: 16/020,097

(22) Filed: Jun. 27, 2018

(65) Prior Publication Data
US 2020/0005474 A1    Jan. 2, 2020

(51) Int. Cl.
*G06T 7/44*    (2017.01)
*G06K 9/62*    (2006.01)
(Continued)

(52) U.S. Cl.
CPC .............. *G06T 7/44* (2017.01); *A01B 63/14* (2013.01); *A01B 76/00* (2013.01); *G06K 9/4614* (2013.01);
(Continued)

(58) Field of Classification Search
CPC ........... G06T 7/44; A01B 76/00; A01B 63/14; G06K 9/4614; G06K 9/6256; G06K 9/6268
(Continued)

(56) References Cited

U.S. PATENT DOCUMENTS 6,721,453 B1    4/2004    Benson et al.
7,400,957 B2    7/2008    Hofer et al.
(Continued)

FOREIGN PATENT DOCUMENTS

WO    WO2017/004074 A1    1/2017
WO    WO2017/049186 A1    3/2017

OTHER PUBLICATIONS

Chiadjeu et al., Segmentation of elevation images based on morphology approach for agricultural clod detection, 5th International Congress on Image and Signal Processing (CISP), China, IEEE, 2012, pp. 701-705. Mar. 5, 2013, 6 pages. https://hal.archives-ouvertes.fr/file/index/docid/797133/filename/PID2529463.pdf.
(Continued)

*Primary Examiner* — Ayodeji O Ayotunde
(74) *Attorney, Agent, or Firm* — Rebecca L. Henkel; Rickard K. DeMille

(57) ABSTRACT

The present disclosure provides systems and methods that measure soil roughness in a field from imagery of the field. In particular, the present subject matter is directed to systems and methods that include or otherwise leverage a machine-learned clod detection model to determine a soil roughness value for a portion of a field based at least in part on imagery of such portion of the field captured by an imaging device. For example, the imaging device can be a camera positioned in a downward-facing direction and physically coupled to a work vehicle or an implement towed by the work vehicle through the field.

20 Claims, 6 Drawing Sheets

(51) Int. Cl.
   *G06K 9/46*    (2006.01)
   *A01B 63/14*   (2006.01)
   *A01B 76/00*   (2006.01)
   *A01B 49/02*   (2006.01)
(52) U.S. Cl.
   CPC ......... *G06K 9/6256* (2013.01); *G06K 9/6268* (2013.01); *A01B 49/02* (2013.01); *G06T 2207/20081* (2013.01); *G06T 2207/30181* (2013.01)
(58) Field of Classification Search
   USPC ....................................................... 382/108
   See application file for complete search history.

(56)         References Cited

U.S. PATENT DOCUMENTS 8,827,001 B2      9/2014   Wendte et al.
   2016/0134844 A1   5/2016   Casper et al.
   2017/0112043 A1*  4/2017   Nair ........................ A01B 33/16
   2018/0206393 A1*  7/2018   Stoller .................... A01B 76/00
   2019/0254223 A1*  8/2019   Eichhorn ................ G01B 21/18

OTHER PUBLICATIONS

Tannouche et al., A fast and Efficient Approach for Weeds Identification Using Haar-Like Features, American-Eurasian Journal of Sustainable Agriculture, ISSN: 1995-0748, EISSN: 1998-1074, vol. 9, Issue 4, 2015, pp. 44-48.

* cited by examiner

DETECTING AND MEASURING THE SIZE OF CLODS AND OTHER SOIL FEATURES FROM IMAGERY

FIELD OF THE INVENTION

The present subject matter relates generally to measuring soil roughness in a field and, more particularly, to measuring soil roughness in a field from imagery of the field using a machine-learned clod detection model.

BACKGROUND OF THE INVENTION

Soil roughness generally refers to the roughness of soil in a field. Soil roughness is a product of or otherwise influenced by the number and size of soil clods included within the soil. Soil clods refer to portions of the soil that are denser than the surrounding soil, thereby forming a separate clod.

For various reasons, it is important to maintain a given amount of soil roughness within a field before or following an agricultural operation. For example, when planting seeds it is generally not desired to have soil clods that are larger than a certain size.

As such, the ability to monitor and/or adjust the amount of soil roughness within a field can be very important to maintaining a healthy, productive field, particularly when it comes to performing tillage and/or planting operations. However, typical soil analysis may be time consuming, expensive, and data intensive.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a computing system that includes one or more processors and one or more non-transitory computer-readable media that collectively store a machine-learned clod detection model configured to receive imagery and to process the imagery to detect soil clods depicted by the imagery. The one or more non-transitory computer-readable media collectively store instructions that, when executed by the one or more processors, configure the computing system to perform operations. The operations include obtaining image data that depicts a portion of a field. The operations include inputting the image data into the machine-learned clod detection model. The operations include receiving one or more bounding shapes as an output of the machine-learned clod detection model. Each of the one or more bounding shapes indicates a respective location of a respective soil clod detected by the machine-learned clod detection model in the image data. The operations include determining a soil roughness value for at least the portion of the field based at least in part on the one or more bounding shapes.

Another example aspect of the present disclosure is directed to a computer-implemented method. The method includes obtaining, by a computing system comprising one or more computing devices, image data that depicts a portion of a field. The method includes inputting, by the computing system, the image data into machine-learned clod detection model configured to receive imagery and to process the imagery to detect soil clods depicted by the imagery. The method includes receiving, by the computing system, one or more bounding shapes as an output of the machine-learned clod detection model. Each of the one or more bounding shapes indicates a respective location of a respective soil clod detected by the machine-learned clod detection model in the image data. The method includes determining, by the computing system, a soil roughness value for at least the portion of the field based at least in part on the one or more bounding shapes.

Another example aspect of the present disclosure is directed to an agricultural work vehicle or implement that includes one or more imaging devices; and a controller that includes one or more processors and one or more non-transitory computer-readable media that collectively store a machine-learned clod detection model configured to receive imagery and to process the imagery to detect soil clods depicted by the imagery. The one or more non-transitory computer-readable media collectively store instructions that, when executed by the one or more processors, configure the controller to perform operations. The operations include obtaining image data that depicts a portion of a field. The operations include inputting the image data into the machine-learned clod detection model. The operations include receiving one or more bounding shapes as an output of the machine-learned clod detection model. Each of the one or more bounding shapes indicates a respective location of a respective soil clod detected by the machine-learned clod detection model in the image data. The operations include determining a soil roughness value for at least the portion of the field based at least in part on the one or more bounding shapes. The operations include controlling operation of one or more ground-engaging tools based at least in part on the soil roughness value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
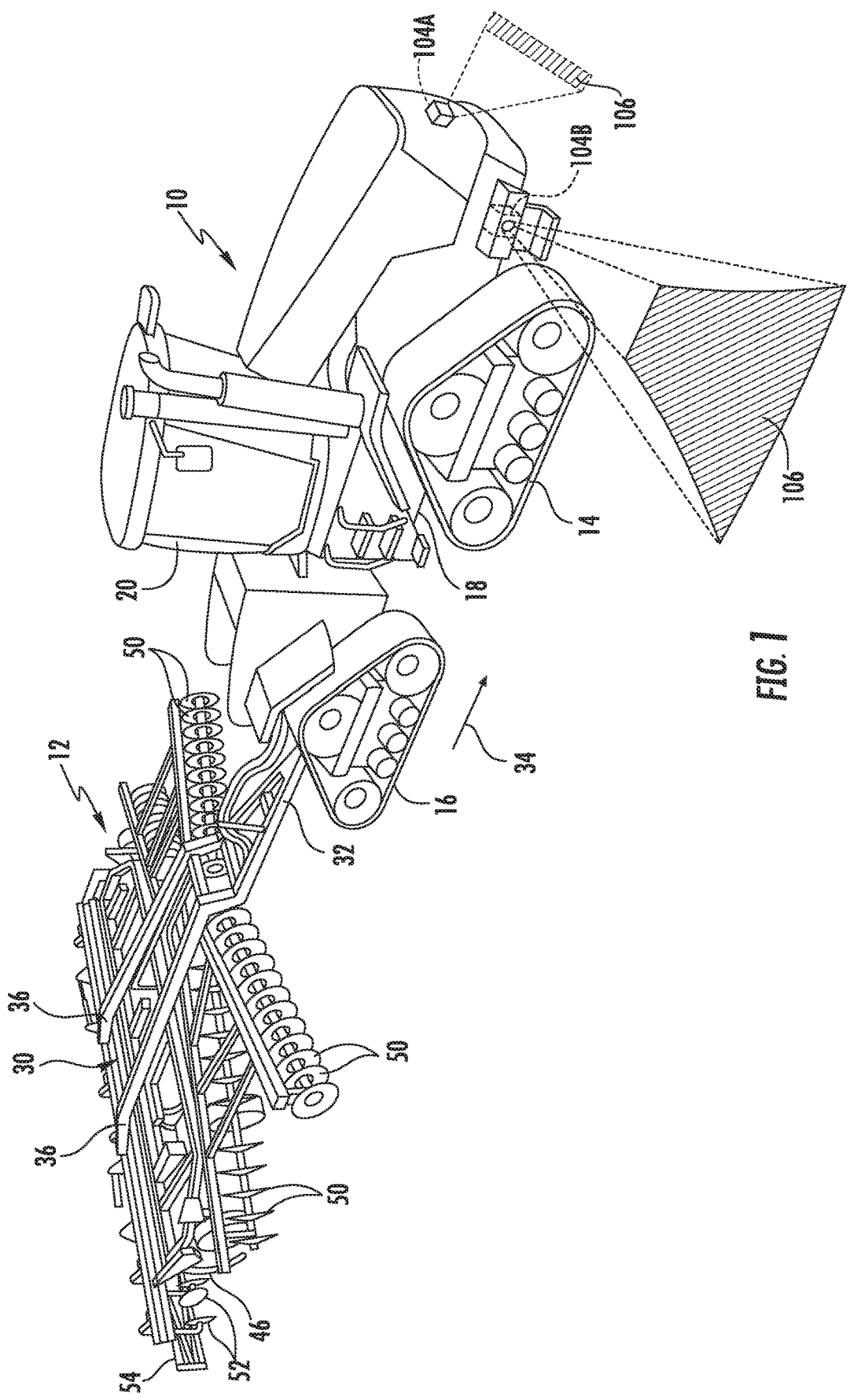
FIG. 1 illustrates a perspective view of one embodiment of a work vehicle towing an implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods that measure soil roughness in a field from imagery of the field. In particular, the present subject matter is directed to systems and methods that include or otherwise leverage a machine-learned clod detection model to determine a soil roughness value for a portion of a field based at least in part on imagery of such portion of the field captured by an imaging device. For example, the machine-learned clod detection model can be configured to receive imagery and to process the imagery to detect soil clods depicted by the imagery.

In particular, in one example, a computing system can obtain image data that depicts a portion of a field. For example, the image data can have been captured by a camera positioned in a (at least partially) downward-facing direction and physically coupled to a work vehicle or an implement towed by the work vehicle through the field. The computing system can input the image data into a machine-learned clod detection model and, in response, receive one or more bounding shapes as an output of the machine-learned clod detection model. Each of the one or more bounding shapes can indicate a respective location of a respective soil clod detected by the machine-learned clod detection model in the image data. The computing system can determine a soil roughness value for at least the portion of the field based at least in part on the one or more bounding shapes. For example, the computing system can determine the soil roughness value based on the respective sizes of the bounding shapes that correspond to detected clods.

Further, the systems and methods of the present disclosure can control an operation of a work vehicle and/or implement based on the soil roughness value. For example, the relative positioning, penetration depth, down force, and/or any other operational parameters associated with one or more ground-engaging tools can be modified based on the soil roughness value, thereby modifying the soil roughness within the field towards a target condition. Thus, the systems and methods of the present disclosure can enable improved real-time control that measures and accounts for existing soil roughness conditions during field operations.

Through the use of a machine-learned clod detection model, the systems and methods of the present disclosure can produce soil roughness estimates that exhibit greater accuracy. These more accurate estimates of soil roughness can enable improved and/or more precise control of the work vehicle and/or implement to obtain a desired soil roughness condition within a field and, as a result, lead to superior agricultural outcomes.

Furthermore, although aspects of the present disclosure are discussed primarily with respect to measurement of soil roughness parameters, the systems and methods of the present disclosure can be generalized or extended to measurement of other physical characteristics of a field. For example, aspects of the present disclosure such as a machine-learned object detection model can also be applied to determination of crop residue characteristics. For example, the machine-learned clod detection model can be trained on different training data so that it recognizes (i.e., detects) crop residue rather than soil clods.

Figure 2:
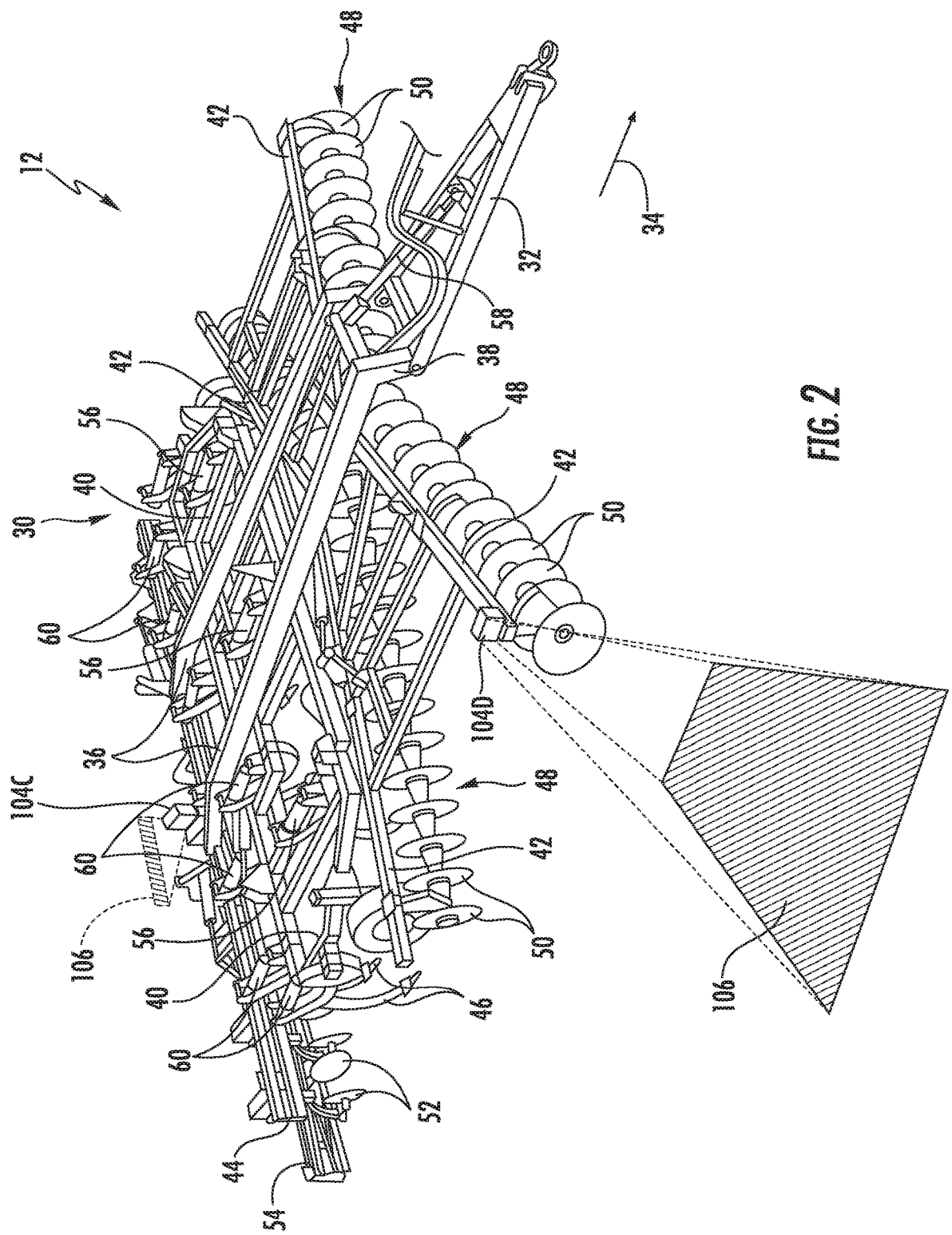
FIG. 2 illustrates a perspective view of the implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor. However, in other embodiments, the work vehicle 10 may be configured as any other suitable agricultural vehicle.

As particularly shown in FIG. 1, the work vehicle 10 includes a pair of front track assemblies 14, a pair of rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 22 (FIG. 3) and a transmission 24 (FIG. 3) mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Moreover, as shown in FIGS. 1 and 2, the implement 12 may generally include a carriage frame assembly 30 configured to be towed by the work vehicle via a pull hitch or tow bar 32 in a travel direction of the vehicle (e.g., as indicated by arrow 34). The carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

As another example, ground-engaging tools can include harrows which can include, for example, a number of tines or spikes, which are configured to level or otherwise flatten any windrows or ridges in the soil. The implement 12 may include any suitable number of harrows. In fact, some embodiments of the implement 12 may not include any harrows.

In some embodiments, the implement 12 may optionally include one or more additional ground-engaging tools, such as one or more basket assemblies or rotary firming wheels. The baskets may be configured to reduce the number of clods in the soil and/or firm the soil over which the implement 12 travels. Each basket may be configured to be pivotally coupled to one of the frames 40, 42, 44, or other components of the implement 12. It should be appreciated that the implement 12 may include any suitable number of baskets. In fact, some embodiments of the implement 12 may not include any baskets. Example basket assemblies are shown at 54, as described further below.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality of closing disks.

In addition, the implement 12 may also include any number of suitable actuators (e.g., hydraulic cylinders) for adjusting the relative positioning, penetration depth, and/or down force associated with the various ground-engaging tools (e.g., ground-engaging tools 46, 50, 52, 54). For instance, the implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the implement 12 may include one or more second actuators 58 coupled to the disk forward frame 42 to adjust the penetration depth and/or the down pressure of the disk blades 50. Moreover, the implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing closing disks on the aft frame 44 of the implement 12 or other modifications. Additionally, in one embodiment, the implement 10 may include a central frame section and one or more wing sections pivotally coupled to the central frame section, such as along opposed sides of the central frame section.

Additionally, in accordance with aspects of the present subject matter, the work vehicle 10 and/or the implement 12 may include one or more imaging devices coupled thereto and/or supported thereon for capturing images or other image data associated with the field as an operation is being performed via the implement 12. Specifically, in several embodiments, the imaging device(s) may be provided in operative association with the work vehicle 10 and/or the implement 12 such that the imaging device(s) has a field of view directed towards a portion(s) of the field disposed in front of, behind, and/or underneath some portion of the work vehicle 10 and/or implement 12 such as, for example, alongside one or both of the sides of the work vehicle 10 and/or the implement 12 as the implement 12 is being towed across the field. As such, the imaging device(s) may capture images from the tractor 10 and/or implement 12 of one or more portion(s) of the field being passed by the tractor 10 and/or implement 12.

In general, the imaging device(s) may correspond to any suitable device(s) configured to capture images or other image data of the field that allow soil clods or other soil features to be detected. For instance, in several embodiments, the imaging device(s) may correspond to any suitable camera(s), such as single-spectrum camera or a multi-spectrum camera configured to capture images, for example, in the visible light range and/or infrared spectral range. Additionally, in a particular embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the imaging device(s) may correspond to any other suitable image capture device(s) and/or vision system(s) that is capable of capturing "images" or other image-like data that allow the soil roughness existing on the soil to be distinguished from the soil. For example, the imaging device(s) may correspond to or include radio detection and ranging (RADAR) sensors and/or light detection and ranging (LIDAR) sensors.

It should be appreciated that work vehicle 10 and/or implement 12 may include any number of imaging device(s) 104 provided at any suitable location that allows images of the field to be captured as the vehicle 10 and implement 12 traverse through the field. For instance, FIGS. 1 and 2 illustrate examples of various locations for mounting one or more imaging device(s) for capturing images of the field. Specifically, as shown in FIG. 1, in one embodiment, one or more imaging devices 104A may be coupled to the front of the work vehicle 10 such that the imaging device(s) 104A has a field of view 106 that allows it to capture images of an adjacent area or portion of the field disposed in front of the work vehicle 10. For instance, the field of view 106 of the imaging device(s) 104A may be directed outwardly from the front of the work vehicle 10 along a plane or reference line that extends generally parallel to the travel direction 34 of the work vehicle 10. In addition to such imaging device(s) 104A (or as an alternative thereto), one or more imaging devices 104B may also be coupled to one of the sides of the work vehicle 10 such that the imaging device(s) 104B has a field of view 106 that allows it to capture images of an adjacent area or portion of the field disposed along such side of the work vehicle 10. For instance, the field of view 106 of the imaging device(s) 104B may be directed outwardly from the side of the work vehicle 10 along a plane or reference line that extends generally perpendicular to the travel direction 34 of the work vehicle 10.

Similarly, as shown in FIG. 2, in one embodiment, one or more imaging devices 104C may be coupled to the rear of the implement 12 such that the imaging device(s) 104C has a field of view 106 that allows it to capture images of an adjacent area or portion of the field disposed aft of the implement. For instance, the field of view 106 of the imaging device(s) 104C may be directed outwardly from the rear of the implement 12 along a plane or reference line that extends generally parallel to the travel direction 34 of the work vehicle 10. In addition to such imaging device(s) 104C (or as an alternative thereto), one or more imaging devices 104D may also be coupled to one of the sides of the implement 12 such that the imaging device(s) 104D has a field of view 106 that allows it to capture images of an adjacent area or portion of the field disposed along such side of the implement 12. For instance, the field of view 106 of the imaging device 104D may be directed outwardly from the side of the implement 12 along a plane or reference line that extends generally perpendicular to the travel direction 34 of the work vehicle 10.

It should be appreciated that, in alternative embodiments, the imaging device(s) 104 may be installed at any other suitable location that allows the device(s) to capture images of an adjacent portion of the field, such as by installing an imaging device(s) at or adjacent to the aft end of the work vehicle 10 and/or at or adjacent to the forward end of the implement 12. It should also be appreciated that, in several embodiments, the imaging devices 104 may be specifically installed at locations on the work vehicle 10 and/or the implement 12 to allow images to be captured of the field both before and after the performance of a field operation by the implement 12. For instance, by installing the imaging device 104A at the forward end of the work vehicle 10 and the imaging device 104C at the aft end of the implement 12, the forward imaging device 104A may capture images of the field prior to performance of the field operation while the aft imaging device 104C may capture images of the same portions of the field following the performance of the field operation. Such before and after images may be analyzed, for example, to evaluate the effectiveness of the operation being performed within the field, such as by allowing the disclosed system to evaluate the amount of soil roughness existing within the field both before and after the tillage operation.

Figure 3:
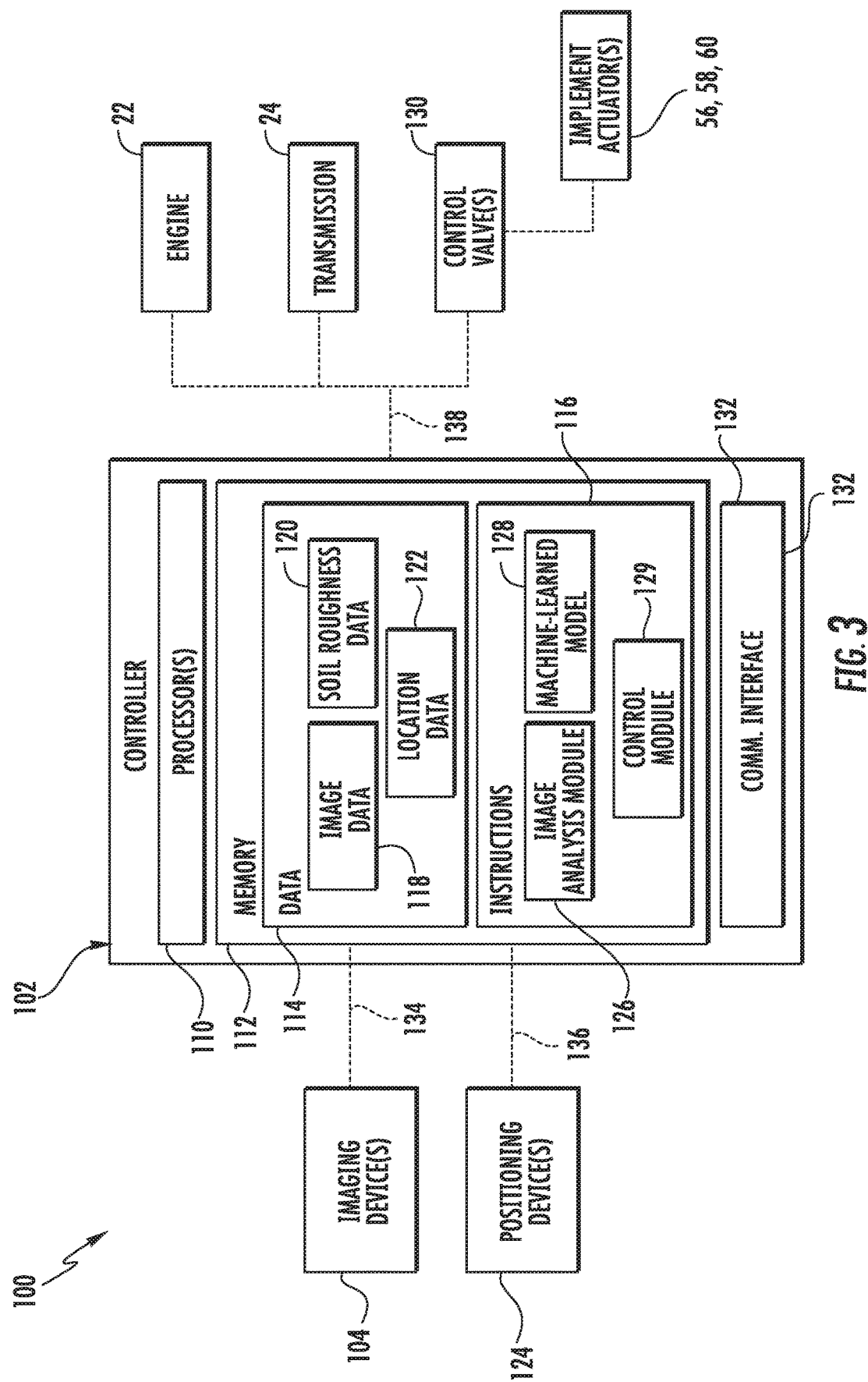
FIG. 3 illustrates a schematic view of one embodiment of a computing system in accordance with aspects of the present subject matter.
Figure 4:
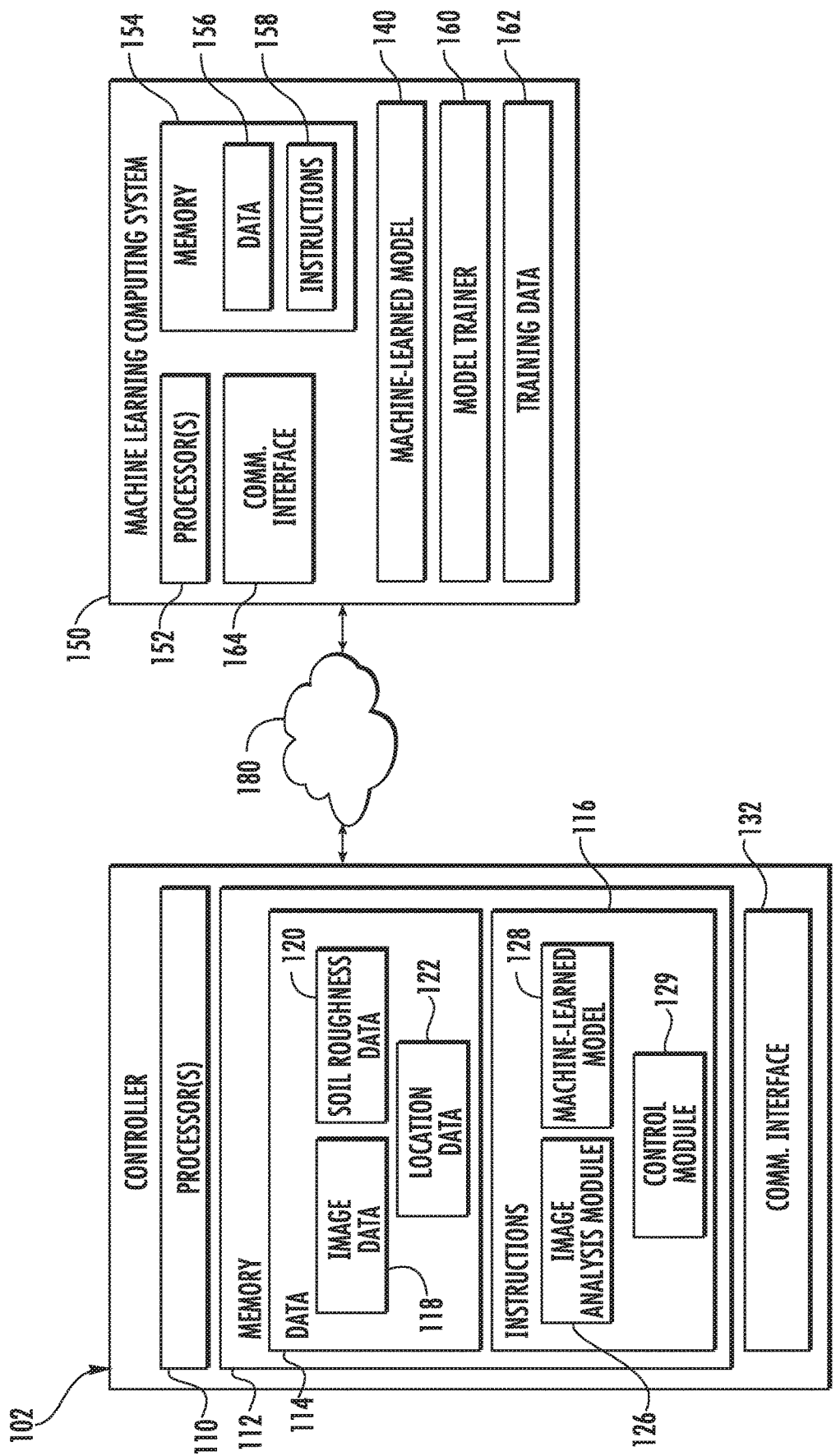
FIG. 4 illustrates a schematic view of one embodiment of a computing system in accordance with aspects of the present subject matter.

Referring now to FIGS. 3 and 4, schematic views of embodiments of a computing system 100 are illustrated in accordance with aspects of the present subject matter. In general, the system 100 will be described herein with reference to the work vehicle 10 and the implement 12 described above with reference to FIGS. 1 and 2. However, it should be appreciated that the disclosed system 100 may generally be utilized with work vehicles having any suitable vehicle configuration and/or implements have any suitable implement configuration.

In several embodiments, the system 100 may include a controller 102 and various other components configured to be communicatively coupled to and/or controlled by the controller 102, such as one or more imaging devices 104 and/or various components of the work vehicle 10 and/or the implement 12. In some embodiments, the controller 102 is physically coupled to the work vehicle 10 and/or the implement 12. In other embodiments, the controller 102 is not physically coupled to the work vehicle 10 and/or the implement 12 (e.g., the controller 102 may be remotely located from the work vehicle 10 and/or the implement 12) and instead may communicate with the work vehicle 10 and/or the implement 12 over a wireless network.

As will be described in greater detail below, the controller 102 may be configured to leverage a machine-learned model 128 to determine a soil roughness value for a portion of a field based at least in part on imagery of such portion of the field captured by one or more imaging devices 104. In particular, FIG. 3 illustrates a computing environment in which the controller 102 can operate to determine soil roughness data 120 for at least a portion of a field based on image data 118 newly received from one or more imaging devices 104 and, further, to control one or more components of a work vehicle and/or implement (e.g., engine 22, transmission 24, control valve(s) 130, etc.) based on the soil roughness data 120. That is, FIG. 3 illustrates a computing environment in which the controller 102 is actively used in conjunction with a work vehicle and/or implement (e.g., during operation of the work vehicle and/or implement within a field). As will be discussed further below, FIG. 4 depicts a computing environment in which the controller 102 can communicate over a network 180 with a machine learning computing system 150 to train and/or receive a machine-learned model 128. Thus, FIG. 4 illustrates operation of the controller 102 to train a machine-learned model 128 and/or to receive a trained machine-learned model 128 from a machine learning computing system 150 (e.g., FIG. 4 shows the "training stage") while FIG. 3 illustrates operation of the controller 102 to use the machine-learned model 128 to actively determine soil roughness values based on obtained imagery of a field (e.g., FIG. 3 shows the "inference stage").

Referring first to FIG. 3, in general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include an image database 118 for storing image data received from the imaging device(s) 104. For example, the imaging device(s) 104 may be configured to continuously or periodically capture images of adjacent portion(s) of the field as an operation is being performed with the field. In such an embodiment, the images transmitted to the controller 102 from the imaging device(s) 104 may be stored within the image database 118 for subsequent processing and/or analysis. It should be appreciated that, as used herein, the term image data may include any suitable type of data received from the imaging device(s) 104 that allows for the soil roughness of a field to be analyzed, including photographs and other image-related data (e.g., scan data and/or the like).

Additionally, as shown in FIG. 3, the memory 12 may include a soil roughness database 120 for storing information related to soil roughness values for the field being processed. For example, as indicated above, based on the image data received from the imaging device(s) 104, the controller 102 may be configured to estimate or calculate one or more values for one or more soil roughness parameters associated with the field, such as a value(s) for the number and/or size of soil clods detected for an imaged portion(s) of the field (and/or a value(s) for the average soil clod size for the field). The soil roughness value(s) estimated or calculated by the controller 102 may then be stored within the soil roughness database 120 for subsequent processing and/or analysis.

Moreover, in several embodiments, the memory 12 may also include a location database 122 storing location information about the work vehicle/implement 10, 12 and/or information about the field being processed (e.g., a field map). Specifically, as shown in FIG. 3, the controller 102 may be communicatively coupled to a positioning device(s) 124 installed on or within the work vehicle 10 and/or on or within the implement 12. For example, in one embodiment, the positioning device(s) 124 may be configured to determine the exact location of the work vehicle 10 and/or the implement 12 using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 124 may be transmitted to the controller 102 (e.g., in the form of coordinates) and subsequently stored within the location database 122 for subsequent processing and/or analysis.

Additionally, in several embodiments, the location data stored within the location database 122 may also be correlated to the image data stored within the image database 118. For instance, in one embodiment, the location coordinates derived from the positioning device(s) 124 and the image(s) captured by the imaging device(s) 104 may both be time-stamped. In such an embodiment, the time-stamped data may allow each image captured by the imaging device(s) 104 to be matched or correlated to a corresponding set of location coordinates received from the positioning device(s) 124, thereby allowing the precise location of the portion of the field depicted within a given image to be known (or at least capable of calculation) by the controller 102.

Moreover, by matching each image to a corresponding set of location coordinates, the controller 102 may also be configured to generate or update a corresponding field map associated with the field being processed. For example, in instances in which the controller 102 already includes a field map stored within its memory 112 that includes location coordinates associated with various points across the field, each image captured by the imaging device(s) 104 may be mapped or correlated to a given location within the field map. Alternatively, based on the location data and the associated image data, the controller 102 may be configured to generate a field map for the field that includes the geo-located images associated therewith.

Likewise, any soil roughness data 120 derived from a particular set of image data (e.g., frame of imagery) can also be matched to a corresponding set of location coordinates. For example, the particular location data 122 associated with a particular set of image data 118 can simply be inherited by any soil roughness data 120 produced on the basis of or otherwise derived from such set of image data 118. Thus, based on the location data and the associated soil roughness data, the controller 102 may be configured to generate a field map for the field that describes, for each analyzed portion of the field, one or more corresponding soil roughness values. Such a map can be consulted to identify discrepancies in or other characteristics of the soil roughness at or among various granular locations within the field.

Referring still to FIG. 3, in several embodiments, the instructions 116 stored within the memory 112 of the controller 102 may be executed by the processor(s) 110 to implement an image analysis module 126. In general, the image analysis module 126 may be configured to analyze the image data 118 to determine the soil roughness data 120. In particular, as will be discussed further below, the image analysis module 126 can cooperatively operate with or otherwise leverage a machine-learned model 128 to analyze the image data 118 to determine the soil roughness data 120. As an example, the image analysis module 126 can perform some or all of method 200 of FIG. 5 and/or method 300 of FIG. 6.

Moreover, as shown in FIG. 3, the instructions 116 stored within the memory 112 of the controller 102 may also be executed by the processor(s) 110 to implement a machine-learned model 128. In particular, the machine-learned model 128 may be a machine-learned clod detection model. The machine-learned clod detection model 128 can be configured to receive imagery and to process the imagery to detect one or more soil clods in the imagery.

Referring still to FIG. 3, the instructions 116 stored within the memory 112 of the controller 102 may also be executed by the processor(s) 110 to implement a control module 129. In general, the control module 129 may be configured to adjust the operation of the work vehicle 10 and/or the implement 12 by controlling one or more components of the implement/vehicle 12, 10. Specifically, in several embodiments, when the soil roughness values determined by the image analysis module 126 differ from target or desired values, the control module 129 may be configured to adjust the operation of the work vehicle 10 and/or the implement 12 in a manner designed to modify the soil roughness outcome of the operation of the work vehicle 10 and/or the implement 12. For instance, when it is desired to have a soil roughness of a certain amount, the control module 129 may be configured to adjust the operation of the work vehicle 10 and/or the implement 12 so as to increase or decrease the soil roughness of the field when the estimated soil roughness amount for a given imaged portion of the field (or an average estimated soil roughness amount across multiple imaged portions of the field) differs from the target amount.

In one example, one or more imaging devices 104 can be forward-looking image devices that collect imagery of upcoming portions of the field. The image analysis module 126 can analyze the imagery to determine soil roughness values for such upcoming portions of the field. The control module 129 can adjust the operation of the work vehicle 10 and/or the implement 12 based on the soil roughness values for such upcoming portions of the field. Thus, the system 100 can proactively manage various operational parameters of the work vehicle 10 and/or the implement 12 to account for upcoming soil roughness conditions in upcoming portions of the field. For example, if an upcoming portion of the field has a larger-than-average soil roughness, then the controller 102 can, in anticipation of reaching such section, modify the operational parameters to account for such larger-than-average soil roughness and vice versa for portions with less-than-average soil roughness.

In another example which may be additional or alternative to the example provided above, one or more imaging devices 104 can be rearward-looking image devices that collect imagery of receding portions of the field that the work vehicle 10 and/or implement 12 has recently operated upon. The image analysis module 126 can analyze the imagery to determine a soil roughness values for such receding portions of the field. The control module 129 can adjust the operation of the work vehicle 10 and/or the implement 12 based on the soil roughness values for such receding portions of the field. Thus, the system 100 can reactively manage various operational parameters of the work vehicle 10 and/or the implement 12 based on observed outcomes associated with current settings of such operational parameters. That is, the system 100 can observe the outcome of its current settings and can adjust the settings if the outcome does not match a target outcome.

It should be appreciated that the controller 102 may be configured to implement various different control actions to adjust the operation of the work vehicle 10 and/or the implement 12 in a manner that increases or decreases the soil roughness of the field. In one embodiment, the controller 102 may be configured to increase or decrease the operational or ground speed of the implement 12 to affect an increase or decrease in the soil roughness amount. For instance, as shown in FIG. 3, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases or decreases the ground speed of the work vehicle 10 and, thus, the ground speed of the implement 12, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24.

In some embodiments, the implement 12 can communicate with the work vehicle 10 to request or command a particular ground speed and/or particular increase or decrease in ground speed from the work vehicle 10. For example, the implement 12 can include or otherwise leverage an ISOBUS Class 3 system to control the speed of the work vehicle 10.

Increasing the ground speed of the vehicle 10 and/or the implement 12 may result in a relative increase in the soil roughness of the field (e.g., relative to the expected roughness absent such increase in ground speed). Likewise, decreasing the ground speed of the vehicle 10 and/or the implement 12 may result in a relative decrease in the soil roughness of the field (e.g., relative to the expected roughness absent such decrease in ground speed).

In addition to the adjusting the ground speed of the vehicle/implement 10, 12 (or as an alternative thereto), the controller 102 may also be configured to adjust an operating parameter associated with the ground-engaging tools of the implement 12. For instance, as shown in FIG. 3, the controller 102 may be communicatively coupled to one or more valves 130 configured to regulate the supply of fluid (e.g., hydraulic fluid or air) to one or more corresponding actuators 56, 58, 60 of the implement 12. In such an embodiment, by regulating the supply of fluid to the actuator(s) 56, 58, 60, the controller 102 may automatically adjust the relative positioning, penetration depth, down force, and/or any other suitable operating parameter associated with the ground-engaging tools of the implement 12. Increasing the penetration depth or down force of the ground-engaging tools may result in a relative decrease in the soil roughness of the field (e.g., relative to the expected roughness absent such increase in penetration depth or down force). Likewise, decreasing the penetration depth or down force of the ground-engaging tools may result in a relative increase in the soil roughness of the field (e.g., relative to the expected roughness absent such decrease in penetration depth or down force).

Moreover, as shown in FIG. 3, the controller 102 may also include a communications interface 132 to provide a means for the controller 102 to communicate with any of the various other system components described herein. For instance, one or more communicative links or interfaces 134 (e.g., one or more data buses) may be provided between the communications interface 132 and the imaging device(s) 104 to allow images transmitted from the imaging device(s) 104 to be received by the controller 102. Similarly, one or more communicative links or interfaces 136 (e.g., one or more data buses) may be provided between the communications interface 132 and the positioning device(s) 124 to allow the location information generated by the positioning device(s) 124 to be received by the controller 102. Additionally, as shown in FIG. 3, one or more communicative links or interfaces 138 (e.g., one or more data buses) may be provided between the communications interface 132 and the engine 22, the transmission 24, the control valves 130, and/or the like to allow the controller 102 to control the operation of such system components.

It should be appreciated that the controller 102 (e.g., the image analysis module 126) may be configured to perform the above-referenced analysis for multiple imaged sections of the field. Each section can be analyzed individually or multiple sections can be analyzed in a batch (e.g., by concatenating imagery depicting such multiple sections).

Referring now to FIG. 4, according to an aspect of the present disclosure, the controller 102 can store or include one or more machine-learned models 128. In particular, the machine-learned model 128 may be a machine-learned clod detection model. The machine-learned clod detection model 128 can be configured to receive imagery and to process the imagery to detect soil clods depicted by the imagery.

As one example, the clod detection model can be or include neural network such as, for example, a convolutional neural network. Example neural networks include feed-forward neural networks, recurrent neural networks (e.g., long short-term memory recurrent neural networks), convolutional neural networks, or other forms of neural networks. Neural networks can include multiple connected layers of neurons and networks with one or more hidden layers can be referred to as "deep" neural networks. Typically, at least some of the neurons in a neural network include non-linear activation functions.

As another example, the clod detection model can be or include a cascading classifier. Cascading classifiers are a particular case of ensemble learning based on the concatenation of several classifiers, using all information collected from the output from a given classifier as additional information for the next classifier in the cascade. One example cascading classifier that can be used is a Haar Cascade classifier. In some embodiments, the Haar Cascade classifier (or other classifier model) can leverage or implement the Viola-Jones object detection framework.

As further examples, the clod detection model can be or can otherwise include various machine-learned models such as a regression model (e.g., logistic regression classifier); a support vector machine; one or more decision-tree based models (e.g., random forest models); a Bayes classifier; a K-nearest neighbor classifier; a texton-based classifier; and/or other types of models including both linear models and non-linear models.

In some embodiments, the machine-learned clod detection model can receive image and can provide one or more bounding shapes as an output. Each of the one or more bounding shapes can indicate a respective location of a respective soil clod detected by the machine-learned clod detection model in the image data. The bounding shapes can be two-dimensional bounding shapes or can be three-dimensional bounding shapes. The bounding shapes can be polygonal (e.g., two dimensional polygons such as triangles, parallelograms, list of 2D vertices, etc.), polyhedral (e.g., three-dimensional polygonal meshes), or can be amorphous (e.g., curved shapes). In one example, each bounding shape can be a bounding box (i.e., rectangle) with a height and a width.

In some embodiments, the controller 102 can receive the one or more machine-learned models 128 from the machine learning computing system 150 over network 180 and can store the one or more machine-learned models 128 in the memory 112. The controller 102 can then use or otherwise run the one or more machine-learned models 128 (e.g., by processor(s) 110).

The machine learning computing system 150 includes one or more processors 152 and a memory 154. The one or more processors 152 can be any suitable processing device such as described with reference to processor(s) 110. The memory 154 can include any suitable storage device such as described with reference to memory 112.

The memory 154 can store information that can be accessed by the one or more processors 152. For instance, the memory 154 (e.g., one or more non-transitory computer-readable storage mediums, memory devices) can store data 156 that can be obtained, received, accessed, written, manipulated, created, and/or stored. In some embodiments, the machine learning computing system 150 can obtain data from one or more memory device(s) that are remote from the system 150.

The memory 154 can also store computer-readable instructions 158 that can be executed by the one or more processors 152. The instructions 158 can be software written in any suitable programming language or can be implemented in hardware. Additionally, or alternatively, the instructions 158 can be executed in logically and/or virtually separate threads on processor(s) 152.

For example, the memory 154 can store instructions 158 that when executed by the one or more processors 152 cause the one or more processors 152 to perform any of the operations and/or functions described herein.

In some embodiments, the machine learning computing system 150 includes one or more server computing devices. If the machine learning computing system 150 includes multiple server computing devices, such server computing devices can operate according to various computing architectures, including, for example, sequential computing architectures, parallel computing architectures, or some combination thereof.

In addition or alternatively to the model(s) 128 at the controller 102, the machine learning computing system 150 can include one or more machine-learned models 140. For example, the models 140 can be the same as described above with reference to the model(s) 128.

In some embodiments, the machine learning computing system 150 can communicate with the controller 102 according to a client-server relationship. For example, the machine learning computing system 150 can implement the machine-learned models 140 to provide a web service to the controller 102. For example, the web service can provide image analysis for soil roughness determination as a service.

Thus, machine-learned models 128 can be located and used at the controller 102 and/or machine-learned models 140 can be located and used at the machine learning computing system 150.

In some embodiments, the machine learning computing system 150 and/or the controller 102 can train the machine-learned models 128 and/or 140 through use of a model trainer 160. The model trainer 160 can train the machine-learned models 128 and/or 140 using one or more training or learning algorithms. One example training technique is backwards propagation of errors ("backpropagation"). Gradient-based or other training techniques can be used.

In some embodiments, the model trainer 160 can perform supervised training techniques using a set of labeled training data 162. For example, the labeled training data 162 can include sets of image data, where each set of image data has been labeled (e.g., manually by an expert and/or manually by a user of the models) with one or more "correct" bounding shapes that indicate the location of soil clods within the image data. The labels/bounding shapes used for the training data 162 can match any of the example labelling/shapes schemes described herein, or other labelling schemes. In other embodiments, the model trainer 160 can perform unsupervised training techniques using a set of unlabeled training data 162. The model trainer 160 can perform a number of generalization techniques to improve the generalization capability of the models being trained. Generalization techniques include weight decays, dropouts, or other techniques. The model trainer 160 can be implemented in hardware, software, firmware, or combinations thereof.

Thus, in some embodiments, the models can be trained at a centralized computing system (e.g., at "the factory") and then distributed to (e.g., transferred to for storage by) specific controllers. Additionally or alternatively, the models can be trained (or re-trained) based on additional training data generated by the user. This process may be referred to as "personalization" of the models and may allow the user to further train the models to provide improved (e.g., more accurate) predictions for unique field conditions experienced by the user.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a communications interface using any type of protocol, protection scheme, encoding, format, packaging, etc.

The machine learning computing system 150 may also include a communications interface 164 to communicate with any of the various other system components described herein.

FIGS. 3 and 4 illustrate example computing systems that can be used to implement the present disclosure. Other computing systems can be used as well. For example, in some embodiments, the controller 102 can include the model trainer 160 and the training dataset 162. In such embodiments, the machine-learned models 128 can be both trained and used locally at the controller 102. As another example, in some embodiments, the controller 102 is not connected to other computing systems.

Figure 5:
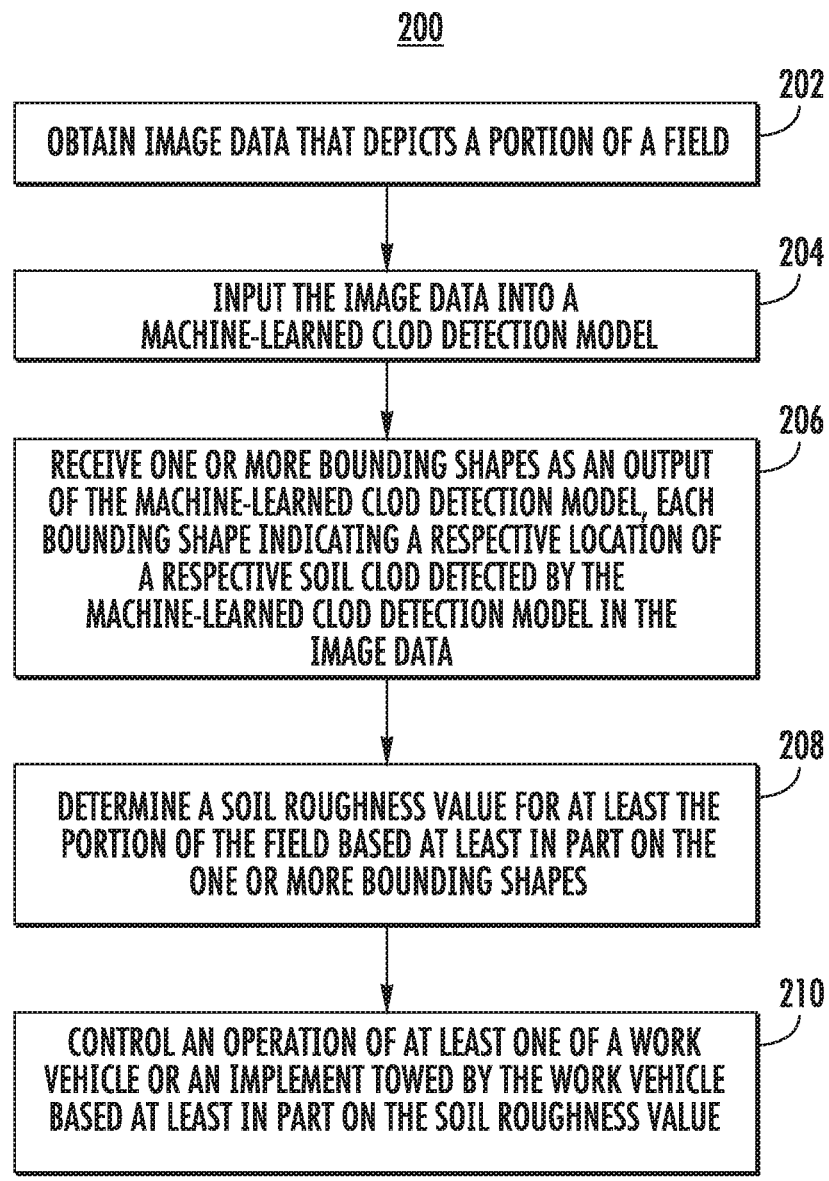
FIG. 5 illustrates a flow diagram of one embodiment of a method for measuring soil roughness in a field in accordance with aspects of the present subject matter.

Referring now to FIG. 5, a flow diagram of one embodiment of a method 200 for controlling agricultural machinery based on image data of a field is illustrated in accordance with aspects of the present subject matter. In general, the method 200 will be described herein with reference to the work vehicle 10 and the implement 12 shown in FIGS. 1 and 2, as well as the various system components shown in FIGS. 3 and/or 4. However, it should be appreciated that the disclosed method 200 may be implemented with work vehicles and/or implements having any other suitable configurations and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include obtaining image data that depicts a portion of a field. For example, as indicated above, the controller 102 may be coupled to one or more imaging devices 104 configured to capture images of various portions of the field.

In some embodiments, the image data obtained at (202) can include a single image frame. Thus, in some embodiments, the method 200 can be performed iteratively for each new image frame as such image frame is received. For example, method 200 can be performed iteratively in real-time as new images are received from the imaging devices 104 while the imaging devices 104 are moved throughout the field (e.g., as a result of being physically coupled to the vehicle 10 or implement 12 which is being operated in the field).

In other embodiments, the image data obtained at (202) can include a plurality of image frames. For example, the plurality of image frames can be concatenated or otherwise combined and processed as a single batch (e.g., by way of a single performance of method 200 over the batch).

Referring still to FIG. 5, at (204), the method 200 may include inputting the image data into a machine-learned clod detection model. For example, the image analysis module 126 of the controller 102 may be configured to input the image data into the clod detection model.

In some embodiments, the inputted image data can correspond to or otherwise include an entirety of the image data, such that all of the image data is analyzed. In other embodiments, the inputted image data can correspond to or otherwise include only a portion or subset of the image data. Using only a subset of the image data can enable reductions in processing time and requirements.

At (206), the method 200 may include receiving one or more bounding shapes as an output of the machine-learned clod detection model. For example, as indicated above, the image analysis module 126 of the controller 102 may be configured to receive the output of the machine-learned clod detection model 128.

Additionally, at (208), the method 200 may include determining a soil roughness value for at least the portion of the field depicted by the image data based at least in part on the one or more bounding shapes output by the clod detection model. The soil roughness value can provide a value for one or more different soil roughness parameters. As one example, the soil roughness value can be an average size of soil clods for the portion of the field depicted by the image data. Any number of different metrics can be used to describe soil roughness, including, in one example, numerical metrics that are not directly descriptive of soil clod size but rather simply indicative of actual soil clod size relative to a desired soil clod size.

In one example, as indicated above, the image analysis module 126 of the controller 102 may, in accordance with aspects of the present subject matter, be configured to perform various processing techniques on the bounding boxes provided for the image data to determine the soil roughness value for the image data. For example, various averaging or combinatorial techniques can be used to determine the soil roughness value from the bounding boxes. The soil roughness value determined at (208) can be stored in memory and/or logically associated with the image data and/or the portion of the field.

Figure 6:
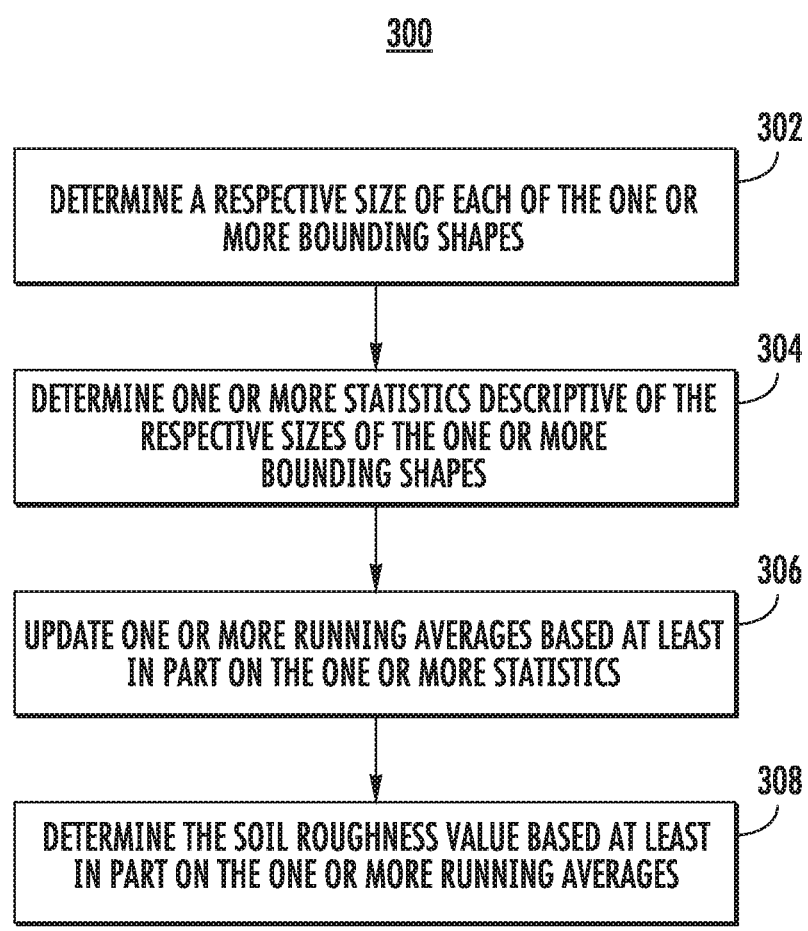
FIG. 6 illustrates a flow diagram of one embodiment of a method for determining a soil roughness value in accordance with aspects of the present subject matter.

More particularly, as one example, FIG. 6 provides a flow diagram of one embodiment of a method 300 for determining a soil roughness value based on bounding boxes in accordance with aspects of the present subject matter. In general, the method 300 will be described herein with reference to the work vehicle 10 and the implement 12 shown in FIGS. 1 and 2, as well as the various system components shown in FIGS. 3 and/or 4. However, it should be appreciated that the disclosed method 300 may be implemented with work vehicles and/or implements having any other suitable configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 may include determining a respective size of each of the one or more bounding shapes. As examples, the size of a bounding shape can include its height, width, area, depth, volume, or other size metric.

In some embodiments, the size of the bounding shape can be estimated in or otherwise translated to meters or other real-world measurements. As an example, camera calibration information and/or assumptions about a pinhole camera model can be used to map image coordinates to the real-world. That is, with some assumptions, the camera calibration can allow the computing system to estimate clod or bounding shape sizes in meters respectively from the bounding shape sizes as measured in pixels.

At (304), the method 300 may include determining one or more statistics descriptive of the respective sizes of the one or more bounding shapes. As examples, the one or more statistics can include one or more of a mean size, a median size, a standard deviation of the respective sizes, a distribution histogram of clod sizes, and/or other statistics. The statistics of size can be expressed in pixels, meters, or other units of measurement.

At (306), the method 300 may include updating one or more running averages based at least in part on the one or more statistics determined at (304). As examples, the one or more running averages can include one or more of: a recursive least squares filter; a least mean squares filter; an autoregressive-moving-average model; a Kalman filter; or other forms of filters or running averages. In some embodiments, a forgetting factor of the running averages can give more weight to the current statistics relative to the past statistics.

At (308), the method 300 may include determining the soil roughness value based at least in part on the one or more running averages. For example, in some embodiments, the current running average can be directly used as the soil roughness value. In other embodiments, the soil roughness value can be derived from current running average according to some relationship including a linear or a non-linear relationship. In yet other embodiments, running averages are not used but instead the statistics determined at (304) are directly used as the soil roughness value or to derive the soil roughness value.

Referring again to method 200 of FIG. 5, after determining the soil roughness value for the image data at (208), then at (210), the method 200 may include controlling the operation of at least one of a work vehicle or an implement as the implement is being towed by the work vehicle across a field based at least in part on the soil roughness value. For example, as indicated above, the control module 129 of the controller 102 of the disclosed system 100 may be configured to control the operation of the work vehicle 10 and/or the implement 12, such as by controlling one or more components of the work vehicle 10 and/or the implement 12 to allow an operation to be performed within the field (e.g., a tillage operation).

As one example, in some embodiments, when the soil roughness value determined at (208) differs from a target value set for such parameter, the controller 102 may be configured to actively adjust the operation of the work vehicle 10 and/or the implement 12 in a manner that increases or decreases the soil roughness of the field before and/or following the operation being performed (e.g., a tillage and/or seed planting operation), such as by adjusting the ground speed at which the implement 12 is being towed and/or by adjusting one or more operating parameters associated with the ground-engaging elements of the implement 12, including, for example, down force, angle or position relative to the ground (e.g., height), and/or other operational parameters associated with the ground-engaging elements. In one particular example, to reduce the soil roughness, the rolling basket pressure and/or speed can be increased.

Furthermore, in some embodiments, the method 200 may further include determining or updating a total soil roughness value for the entire field based on the soil roughness value determined at (208). For example, the total soil roughness value can be an overall average or a running average. The total soil roughness value can also be expressed in the form of a field map for the field that describes, for each analyzed portion of the field, one or more corresponding soil roughness values. Such a map can be consulted to identify discrepancies in or other characteristics of the soil roughness at or among various granular locations within the field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computing system, comprising:
one or more processors; and
one or more non-transitory computer-readable media that collectively store:
a machine-learned clod detection model configured to receive imagery and to process the imagery to detect soil clods depicted by the imagery; and
instructions that, when executed by the one or more processors, configure the computing system to perform operations, the operations comprising:
obtaining image data that depicts a portion of a field;
inputting the image data into the machine-learned clod detection model;
receiving one or more bounding shapes as an output of the machine-learned clod detection model, wherein each of the one or more bounding shapes indicates a respective location of a respective soil clod detected by the machine-learned clod detection model in the image data; and
determining a soil roughness value for at least the portion of the field based at least in part on the one or more bounding shapes.

2. The computing system of claim 1, wherein:
the computing system is physically located on at least one of a work vehicle or an implement towed by the work vehicle;
obtaining the image data of the field comprises obtaining image data captured by an imaging device that is physically located on at least one of the work vehicle or the implement towed by the work vehicle; and
the operations further comprise controlling an operation of at least one of the work vehicle or the implement towed by the work vehicle based at least in part on the soil roughness value determined from the image data.

3. The computing system of claim 1, wherein the machine-learned clod detection model comprises a Haar Cascade Classifier.

4. The computing system of claim 1, wherein determining the soil roughness value for at least the portion of the field based at least in part on the one or more bounding shapes comprises:
determining a respective size of each of the one or more bounding shapes; and
determining the soil roughness value for at least the portion of the field based at least in part on the respective sizes of the one or more bounding shapes.

5. The computing system of claim 4, wherein the respective size of each bounding shape comprises one or more of a height, a width, or an area of such bounding shape.

6. The computing system of claim 5, wherein determining the soil roughness value for at least the portion of the field based at least in part on the respective sizes of the one or more bounding shapes comprises:
determining one or more statistics descriptive of the respective sizes of the one or more bounding shapes; and determining the soil roughness value for at least the portion of the field based at least in part on the one or more statistics.

7. The computing system of claim 6, wherein the one or more statistics comprise one or more of a mean size, a median size, a standard deviation of the respective sizes, or a distribution histogram of sizes.

8. The computing system of claim 6, wherein determining the soil roughness value for at least the portion of the field based at least in part on one or more statistics comprises:
    updating one or more running averages based at least in part on the one or more statistics; and
    determining the soil roughness value for at least the portion of the field based at least in part on the one or more running averages.

9. The computing system of claim 8, wherein the one or more running averages comprise one or more of:
    a recursive least squares filter;
    a least mean squares filter;
    an autoregressive-moving-average model; or
    a Kalman filter.

10. The computing system of claim 1, wherein the image data comprises a plurality of image frames.

11. The computing system of claim 1, wherein the image data comprises a single image frame and wherein the operations further comprise:
    obtaining a plurality of image frames that depict respective portions of the field;
    performing the operations recited in claim 1 for each of the plurality of image frames to determine a plurality of frame-wise soil roughness values respectively for the plurality of image frames; and
    determining a total soil roughness value for the field based at least in part on the plurality of frame-wise soil roughness values.

12. A computer-implemented method, comprising:
    obtaining, by a computing system comprising one or more computing devices, image data that depicts a portion of a field;
    inputting, by the computing system, the image data into machine-learned clod detection model configured to receive imagery and to process the imagery to detect soil clods depicted by the imagery;
    receiving, by the computing system, one or more bounding shapes as an output of the machine-learned clod detection model, wherein each of the one or more bounding shapes indicates a respective location of a respective soil clod detected by the machine-learned clod detection model in the image data; and
    determining, by the computing system, a soil roughness value for at least the portion of the field based at least in part on the one or more bounding shapes.

13. The computer-implemented method of claim 12, wherein:
    the computing system is physically located on at least one of a work vehicle or an implement towed by the work vehicle;
    obtaining, by the computing system, the image data of the field comprises obtaining, by the computing system, image data captured by an imaging device that is physically located on at least one of the work vehicle or the implement towed by the work vehicle; and
    the method further comprises controlling an operation of at least one of the work vehicle or the implement towed by the work vehicle based at least in part on the soil roughness value determined from the image data.

14. The computer-implemented method of claim 12, wherein the machine-learned clod detection model comprises a Haar Cascade Classifier.

15. The computer-implemented method of claim 12, wherein determining, by the computing system, the soil roughness value for at least the portion of the field based at least in part on the one or more bounding shapes comprises:
    determining, by the computing system, a respective size of each of the one or more bounding shapes; and
    determining, by the computing system, the soil roughness value for at least the portion of the field based at least in part on the respective sizes of the one or more bounding shapes.

16. The computer-implemented method of claim 15, wherein the respective size of each bounding shape comprises one or more of a height, a width, or an area of such bounding shape.

17. The computer-implemented method of claim 15, wherein determining, by the computing system, the soil roughness value for at least the portion of the field based at least in part on the respective sizes of the one or more bounding shapes comprises:
    determining, by the computing system, one or more statistics descriptive of the respective sizes of the one or more bounding shapes; and
    determining, by the computing system, the soil roughness value for at least the portion of the field based at least in part on the one or more statistics.

18. The computer-implemented method of claim 17, wherein determining, by the computing system, the soil roughness value for at least the portion of the field based at least in part on one or more statistics comprises:
    updating, by the computing system, one or more running averages based at least in part on the one or more statistics; and
    determining, by the computing system, the soil roughness value for at least the portion of the field based at least in part on the one or more running averages.

19. The computer-implemented method of claim 18, wherein the one or more running averages comprise one or more of:
    a recursive least squares filter;
    a least mean squares filter;
    an autoregressive-moving-average model; or
    a Kalman filter.

20. An agricultural work vehicle or implement, comprising:
    one or more imaging devices; and
    a controller comprising one or more processors and one or more non-transitory computer-readable media that collectively store:
        a machine-learned clod detection model configured to receive imagery and to process the imagery to detect soil clods depicted by the imagery; and
        instructions that, when executed by the one or more processors, configure the controller to perform operations, the operations comprising:
            obtaining image data that depicts a portion of a field;
            inputting the image data into the machine-learned clod detection model;
            receiving one or more bounding shapes as an output of the machine-learned clod detection model, wherein each of the one or more bounding shapes indicates a respective location of a respective soil clod detected by the machine-learned clod detection model in the image data;

determining a soil roughness value for at least the portion of the field based at least in part on the one or more bounding shapes; and controlling operation of one or more ground-engaging tools based at least in part on the soil roughness value.

* * * * *